(12) United States Patent
Epple et al.

(10) Patent No.: US 7,455,162 B2
(45) Date of Patent: Nov. 25, 2008

(54) FRICTION LINING PLATES

(75) Inventors: Thomas Epple, Immenstaad (DE); Jörg Beckmann, Friedrichshafen (DE); Bruno Campaner, La Brede (FR); Andreas Donges, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 348 days.

(21) Appl. No.: 10/570,816

(22) PCT Filed: Aug. 19, 2004

(86) PCT No.: PCT/EP2004/009284

§ 371 (c)(1),
(2), (4) Date: Mar. 31, 2006

(87) PCT Pub. No.: WO2005/028907

PCT Pub. Date: Mar. 31, 2005

(65) Prior Publication Data

US 2006/0191768 A1     Aug. 31, 2006

(30) Foreign Application Priority Data

Sep. 12, 2003   (DE) ............................... 103 42 271

(51) Int. Cl.
*F16D 13/72*   (2006.01)
(52) U.S. Cl. .................. 192/113.36; 192/70.12; 192/107 R
(58) Field of Classification Search ............. 192/113.36
See application file for complete search history.

(56) References Cited

U.S. PATENT DOCUMENTS

| | | | |
|---|---|---|---|
| 2,816,630 A | 12/1957 | Kelley et al. | |
| 3,202,253 A | 8/1965 | Merritt et al. | |
| 3,476,228 A | 11/1969 | Pritchard | |
| 3,972,400 A | 8/1976 | Howells | |
| 4,207,969 A | 6/1980 | Howell | |
| 4,287,978 A * | 9/1981 | Staub, Jr. ............... | 192/113.36 |
| 5,335,765 A | 8/1994 | Takakura et al. | |
| 5,460,255 A | 10/1995 | Quigley | |
| 5,669,474 A | 9/1997 | Dehrmann et al. | |
| 6,119,828 A | 9/2000 | Parsons | |

(Continued)

FOREIGN PATENT DOCUMENTS

AT   2 20 893   4/1962

(Continued)

*Primary Examiner*—Richard M. Lorence
(74) *Attorney, Agent, or Firm*—Davis Bujold & Daniels P.L.L.C.

(57) ABSTRACT

A friction lining plate for a wet-running frictional shift element that can rotate in the assembled condition with no preferred rotation direction, with at least one annular disk-like friction surface that serves for frictional engagement, having grooves through which coolant can flow. The grooves form two overlapping groove sets. Each groove of the first groove set extends at a first angle inclined obliquely to the radial direction and backward relative to a first rotation direction. Each groove of the second groove set extends at a second angle inclined obliquely to the radial direction and forward relative to a first rotation direction. Each groove of the second groove set intersects a groove of the first set in such manner that a groove intersection point is located at the inside diameter of the friction surface or a groove intersection point is located at the outside diameter of the friction surface.

14 Claims, 1 Drawing Sheet

U.S. PATENT DOCUMENTS 6,202,814 B1 * 3/2001 Braford, Jr. .............. 192/70.12
6,454,072 B1 9/2002 Merkel et al.
6,776,272 B2 8/2004 Granderath

FOREIGN PATENT DOCUMENTS

| | | | |
|---|---|---|---|
| DE | 43 22 231 A1 | 1/1995 | |
| DE | 44 32 624 C1 | 4/1996 | |
| DE | 199 57 511 A1 | 6/2001 | |
| DE | 100 08 167 A1 | 8/2001 | |
| GB | 916856 | 1/1963 | |
| JP | 11336805 A | * 12/1999 | |

* cited by examiner

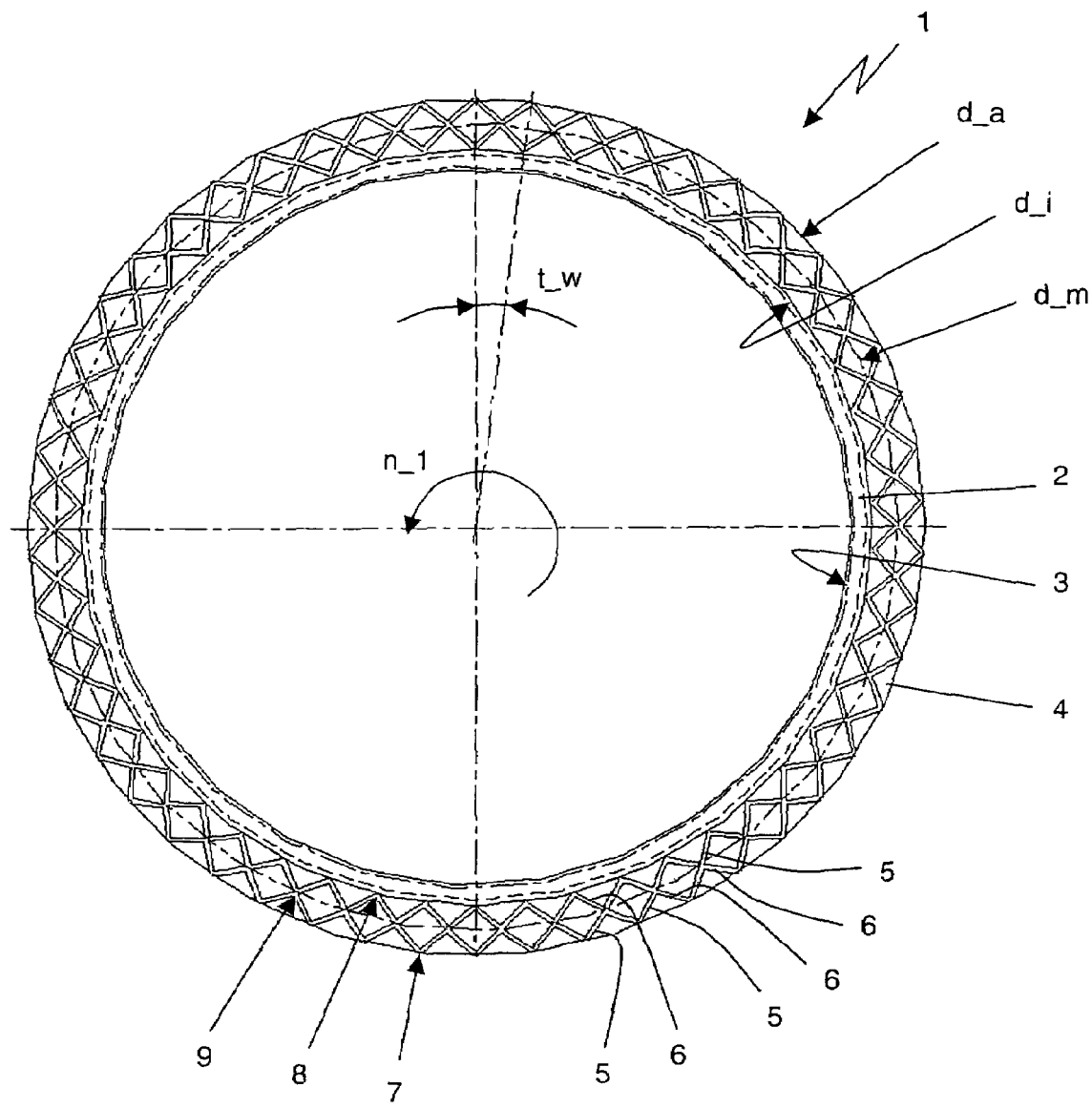

FRICTION LINING PLATES

This application is a national stage completion of PCT/EP2004/009284 filed Aug. 19, 2004 which claims priority from German Application Serial No. 103 42 271.4 filed Sep. 12, 2003.

FIELD OF THE INVENTION

The invention concerns a friction lining plate for a wet-running, frictional shift element with at least one annular disk-like, friction surface serving for frictional engagement, which has grooves through which coolant can flow such that the grooves form two overlapping groove sets.

BACKGROUND OF THE INVENTION

Disk clutches or disk brakes usually comprise a plurality of annular disks. A first group with toothed outside disks is arranged rotationally fixed in a disk carrier, and a second group with toothed inside disks is arranged rotationally fixed on a hub. Viewed in the axial direction of the shift element, the disks of the two groups engage in one another in the manner of gears. The two groups can be displaced, relative to one another, in the axial direction and can, therefore, be brought into frictional connection in pairs.

Friction lining plates are usually constructed as sandwiches with a support sheet consisting, for example, of steel, and with at least one friction lining arranged on an annular surface of the support sheet and generally fixed permanently to the latter. The friction lining generally consists of a fibrous mass made from a paper-containing material or even of carbon.

In practice, disks covered by a friction lining on one side and also on both sides are used. In the case of disks lined on one side, in each case, two adjacent disks co-operate in the sense that the friction lining of one disk comes in contact with the support sheet of the other disk when the shift element is engaged. With disks lined on both sides, in each case, a disk lined on both sides is arranged between two adjacent unlined disks. These smooth, unlined disks are usually made of steel.

As is known, during a shift process and, especially during prolonged slip operation of such a disk clutch or disk brake in friction surface contact, high temperatures are produced owing to the friction work and friction power involved. To dissipate the corresponding large amount of heat outwards, a flow of suitable coolant and lubricant—generally oil—onto the disks is usually provided. In most cases, the stream of cooling oil passes over the disks radially outward from their inside diameter and flows through the disk pack through grooves milled or pressed into the friction lining, generally from the inside outward.

To improve the heat dissipation, numerous geometrical designs are known for friction lining grooves. As basic groove patterns, groups of parallel grooves, so-termed waffle grooves, radial grooves and tangential grooves can be mentioned. Frequently, different basic groove patterns are combined with one another.

For example, from U.S. Pat. No. 5,335,765, a wet-running, friction lining plate for an automatic transmission clutch is known, in which two sets of grooves are pressed into the friction surface. The grooves of the two groove sets are distributed symmetrically on the circumference of the friction surface. Each groove of the two groove sets extends at an oblique angle inclined backward relative to the rotation direction from the inside edge of the friction surface to its outer edge. The cooling oil for heat dissipation passes from the inside diameter of the friction surface into the grooves. To achieve a rapid flow of cooling oil from the inside outward, the inclination angle of the grooves of the second groove set is larger than the inclination angle of the grooves of the first groove set, such that each of the second grooves opens into a first groove and extends from that point outward to the outer diameter of the friction surface. The first and second grooves "meet" near the inside diameter of the friction surface, such that the cooling oil inlet cross-section available for cooling oil to flow radially through the friction lining plate, corresponds to the free cross-section of the first grooves at the inside diameter of the friction surface. The cooling oil outlet cross-section corresponds to the sum of the free cross-sections of the first and second grooves at the outer diameter of the friction surface and is about twice as large as the cooling oil inlet cross-section. In relation to the area of the friction lining, the total grooved fraction is relatively small. Corresponding to the orientation of the two groove sets, this friction lining plate has a preferred rotation direction and can only be operated in this one rotation direction without adverse effect on its function.

For the converter-bridging clutch of a torque converter, DE 44 32 624 C1 proposes a friction lining attached on an axially displaceable piston, which has a plurality of grooves or recesses for the passage of cooling oil that extend between the radially outer and radially inner edge of the friction lining in the circumferential direction at a defined angle with a varying radial distance from the rotation axis of the friction lining. Each groove or recess changes its extension direction between an inlet and an outlet point for the cooling oil at least once so that its radial component is directed the opposite way to that before the change. Distributed circumferentially there are only a few inlets at the outside diameter of the friction lining and only a few outlets at its inside diameter. The inlets and outlets of the grooves are perpendicular to the rotation direction. Along the course of each groove from the radially outer to the radially inner edge of the friction lining pockets are arranged in the groove cross-section for the intermediate storage of cooling oil. Correspondingly, the groove cross-section expands in sections along the course of the groove and then narrows again further along. The inlet and outlet cross-sections of individual grooves are the same. This groove design is intended to give the most uniform possible cooling of the friction lining surface without needing a comparatively large cooling oil throughput for this.

Besides the cooling oil throughput through the disk pack of the frictional shift element in a shifting process and during prolonged slip operation, the geometrical design of the friction lining grooves also influences the rotary vibration behavior of the frictional shift element when torque is taken up in the shifting process. Regardless of the rotation uniformity of the input torque of the frictional shift element, an unfavorable variation of the coefficient of friction acting between the contact areas of the disks can lead to self-induced, irritating rotary vibrations. Such an unfavorable friction coefficient variation can, for example, come about if a "planing effect" that depends on a rotation speed difference occurs between the smooth disk surfaces and the friction lining surfaces when disks lined on both sides with a friction lining are used, i.e., between steel and lining disk surfaces. This effect is known in practice, especially with disk clutches or disk brakes, with a high torque capacity and high cooling oil demand because of the frictional work.

To compensate such "planing effects", DE 199 57 511 A1 proposes a friction lining plate for a shift clutch in which the two different basic groove, shape patterns are combined with one another. On the one hand, the friction lining fixed on the annular support sheet has several grooves distributed at the circumference, which run from the inside diameter of the friction lining along radial lines or secants and are cut relatively deeply (if necessary, down to the support sheet) in the friction lining. These grooves serve as "pumping grooves" for the cooling oil passing outward from the inside diameter of the friction lining and they convey relatively large oil flows and thus carry away a large part of the friction heat generated during slipping operation. In addition, the friction lining has a second group of grooves arranged on the surface of the friction lining in the manner of a grid and cut less deeply into the friction lining. Thus, this "waffle grooving" overlaps with the groove pattern of the "pumping grooves" and is mainly intended to reduce excess cooling oil and, therefore, also hydrodynamic effects which result in "planing" of the friction linings on the oil film. Correspondingly, the grooves of the "waffle grooving" are more numerous than the "pumping grooves" and are also much closer together so that individual "waffle grooves" can always be associated with one of two subgroups. The grooves of these two subgroups run parallel to one another and the grooves of the two subgroups intersect at a certain angle (preferably 90 degrees). In accordance with the non circular-symmetric orientation of the "waffle grooving", the free groove cross-section of individual "waffle grooves" at the inside diameter of the friction lining, into which the cooling oil supplied can enter directly, is rather random. In production technology terms, the "waffle grooving" is superimposed on the "pumping grooves" and the production of such a friction lining plate is correspondingly elaborate and costly process.

The purpose of the present invention is to develop a friction lining plate for a wet-running, frictional shift element which, on the one hand, enables the dissipation of a large amount of heat produced during slippage and, on the other hand, is not sensitive to rotary vibrations when the torque is taken up as the frictional shift element closes. The friction, lining plate must also be usable independently of the rotation direction without adverse effect on its function and should be comparatively inexpensive to manufacture.

SUMMARY OF THE INVENTION

Beginning from the prior art, the friction lining plate, according to the invention, is intended for incorporation in a wet-running, frictional, shift element and comprises at least one annular disk-like, friction surface which serves for frictional engagement. This friction surface has several circumferentially distributed grooves through which coolant can flow to dissipate the heat. The grooves form two overlapping groove sets.

In the assembled condition, the friction lining plate rotates without any preferred rotation direction. The corresponding frictional, shift element can be either a disk clutch or a disk brake.

Each groove of the first groove set extends at a first angle inclined obliquely to the radial direction and backward relative to a first rotation direction as a through-going groove from the inside diameter to the outside diameter of the friction surface. Each groove of the second groove set extends at a second angle inclined obliquely to the radial direction and forward relative to the first rotation direction as a through-going groove from the inside diameter to the outside diameter of the friction surface.

In a first solution of the objectives according to the invention, it is proposed that each groove of the second groove set intersects a groove of the first groove set in such a manner that the groove intersection point lies on the inside diameter of the friction surface. The total groove cross-section area at the inside diameter of the friction surface is then smaller than the total groove cross-section area at a friction surface diameter intermediate between the inside and outside diameters of the friction surface. According to the invention, the grooving is preferably combined with coolant delivery from the inside diameter of the friction surface outward.

In a second solution of the objectives according to the invention, it is proposed that each groove of the second groove set intersects with a groove of the first groove set in such a manner that the groove intersection point lies on the outside diameter of the friction surface. The total groove cross-section area at the outside diameter of the friction surface is then smaller than the total groove cross-section area at a friction surface diameter intermediate between the inside and outside diameters of the friction surface. This grooving is preferably combined with coolant delivery from the outside diameter of the friction surface inward, according to the invention.

In both solutions of the objectives according to the invention, the groove pattern has no groove edges orientated perpendicularly to the rotation direction of the friction lining plate (i.e., in the radial direction), although all the grooves of both groove sets are through-going from the inside to the outside diameters of the friction surface. In particular, this harmonizes the rotational influences of the coolant flow within the grooving of the friction lining plate.

In an advantageous embodiment of the invention, it is proposed that each groove of the second groove set also intersects with a groove of the first groove set in such a manner that an additional groove intersection point is located in the area of a middle friction surface diameter. The grooves of the two groove sets can be distributed symmetrically around the circumscribing circle of the friction surface. The result is an X-shaped groove pattern and, as regards function, a particularly suitable combination of residual net friction areas (available for effective torque transfer), friction coefficient variation and insensitivity to rotary vibrations.

According to the invention, the groove formation produces a "snowplow" effect on the friction surface areas that remain next to the grooves, which slightly sweeps the coolant (as a rule, oil) away from the contact area between the friction surface and the smooth surface against it. Since the groove cross-section area, where the coolant enters the grooves of the friction lining plate, is smaller than the groove cross-section area in the region of the contact surfaces between the friction surface of the friction lining plate and the smooth surface against the latter, on the one hand, a certain suction effect is produced for new coolant flowing is radially (from the inside or the outside) while, on the other hand, a sufficiently large free groove volume is made available to receive the coolant from the friction surface. The known "planing effect" is at least effectively reduced, without having to reduce the net friction surface of the friction lining plate effectively available for torque transfer by an undesirably large percentage of grooved fraction. The percentage groove fraction of the friction lining plate, according to the invention, for example, can be about 20% to 30% of the total friction surface defined geometrically by the inside and outside diameters.

Other advantages are a more favorable friction coefficient variation, especially during the closing of the frictional shift element, and a distinctly reduced tendency toward rotary vibrations during slip operation of the frictional shift element.

In another embodiment of the invention, it is proposed that each groove of the second groove set intersects with a groove of the first groove set in such a manner that a first groove intersection point is located at the inside diameter of the friction surface and a second groove intersection point at its outside diameter. The total groove cross-section area at both the inside and the outside diameter of the friction surface will then be smaller than the groove cross-section area at a friction surface diameter intermediate between the inside and outside diameters of the friction surface. With this design of the through-going grooves, the friction lining plate can be used universally for both coolant delivery directions.

As another design feature of the invention, it is proposed that the grooves of both groove sets have a constant groove width or constant groove cross-section along their radial groove extension in each case. Preferably, the groove width or cross-section of the grooves of the first groove set are identical to those of the grooves of the second set, but they can also be different. In contrast, if non-constant cross-sections are provided along the respective radial groove extensions, then the total groove cross-section at the friction surface diameter where the coolant is fed into the grooves is always the smallest total groove cross-section of all the diameter-related total groove cross-sections.

In principle, the groove structure according to the invention, is not limited to any special type of friction surface; the friction lining plate can be made both as a sandwich structure with a support sheet (having a carrier profile); a friction lining permanently attached (for example, bonded) to the support sheet, and also as a one-piece plate with the support sheet and friction lining made of the same material. The friction lining plate can be made both as a plate lined on only one side with a friction lining and as a plate lined on both sides. The friction linings or friction surfaces can be made, for example, from paper-containing fiber materials, carbon fiber materials, carbon or ceramic materials.

BRIEF DESCRIPTION OF THE DRAWING

The invention will now be described, by way of example, with reference to the accompanying drawing in which:

The sole FIGURE illustrates an example of a wet-running friction lining plate for a disk clutch or disk brake, which rotates in the assembly condition.

DETAILED DESCRIPTION OF THE INVENTION

A friction lining plate (indexed as 1 in the FIGURE), for example, made as a sandwich structure with an annular disk-like, support sheet 2 and an annular disk-like, friction lining permanently attached on a flat face of the support sheet 2, for example, by adhesive bonding. The support sheet is made of steel and has a carrier profile 3 for positive-lock connection to a disk carrier (not shown), in this case on the inside diameter of the support sheet 2. Clearly, a corresponding carrier profile could also be provided on the outside diameter of the support sheet in another design of the fiction, lining plate.

The flat, annular disk-like, upper side of the friction lining forms a friction surface 4 of the friction lining plate 1 that serves for frictional engagement and is geometrically defined by an outside diameter $d\_a$ and an inside diameter $d\_i$. The intermediate middle diameter of the friction surface 4 is indexed $d\_m$. The friction lining material can be paper-containing fiber materials, carbon fiber materials, carbon or even ceramic. The "net friction surface" of the friction lining plate 1 that can be used for torque transfer is reduced by grooves milled or pressed into the friction surface 4 of the friction lining. Two different overlapping sets of grooves are provided. Grooves of the first groove set are indexed 5 and those of a second groove set 6.

All the grooves 5, 6 are made as through-going grooves and extend from the inside diameter $d\_i$ to the outside diameter $d\_a$ of the friction surface 4. This enables coolant to pass from the inside diameter of the friction lining plate 1 to its outside diameter or vice-versa, when the friction lining plate is in frictional engagement and the corresponding frictional shift element is thus in slip operation or is fully engaged.

Each groove 5 of the first groove set extends at a first angle inclined obliquely to the radial direction and backward relative to a first rotation direction $n\_1$ of the friction lining plate 1 from the inside diameter $d\_i$ to the outside diameter $d\_a$ of the friction surface, and each groove 6 of the second groove set extends at a second angle inclined obliquely to the radial direction and forward relative to the first rotation direction $n\_1$ from the inside diameter $d\_i$ to the outside diameter $d\_a$ of the friction surface. None of the grooves 5, 6 has any groove edge orientated perpendicularly to the rotation direction of the friction lining plate (i.e., in the radial direction).

In the example embodiment illustrated, the grooves 5, 6 are distributed symmetrically around the circumference and a corresponding distribution angle between them is indexed $t\_w$. Also to be regarded, as an example, is the angle shown in the FIGURE of about 45 degrees in relation to the rotation direction $n\_1$ backward or forward relative to the radial direction. Clearly, in other designs, a more acute or less acute angle could also be provided.

In the example embodiment illustrated, both the grooves 5 of the first groove set and the grooves 6 of the second groove set have the same groove width which is constant along the radial extension of the groove or the same groove cross-section constant along the radial extension. In other designs, for example, it could be provided that the grooves 5, 6 of the two groove sets have a constant groove width or groove cross-section that is constant along their radial groove extension, but the widths or cross-sections of the respective grooves 5 and 6 are different.

According to the invention, the second groove set overlaps the first groove set so that special intersection points are formed between the grooves 6 of the second groove set and the grooves 5 of the first set. As shown in the FIGURE, each groove 6 of the second groove set intersects a groove 5 of the first set such that there is a first groove intersection point 8 at the inside diameter $d\_i$ and a second groove intersection point 7 at the outside diameter $d\_a$ of the friction surface. An essential feature of the invention is that the total groove cross-section area at the inside diameter $d\_i$ and, respectively, at the outside diameter $d\_a$ of the friction surface is smaller than the total groove cross-section area at a friction surface diameter intermediate between the inside $d\_i$ and outside $d\_a$ diameters of the friction surface.

Owing to the symmetrical distribution of the first and second groove sets, along the circumferential direction, each groove 6 of the second groove set also intersects the groove 5 of the first set in the area of the middle diameter $d\_m$ of the friction surface 4, a corresponding intersection point being indexed 9. In the example embodiment illustrated, there is therefore an X-shaped groove pattern with symmetrical distribution around the circumscribing circle of the friction surface 4. This symmetry is decisive in enabling the friction lining plate 1 to be operated in both rotation directions, without any preferred rotation direction.

A further essential feature of the invention is that despite the overlap of the two groove sets in the groove pattern as a whole, no groove edge is orientated perpendicularly to the rotation direction of the friction lining plate (i.e., in the radial direction).

The actual total groove cross-section of all the grooves 5, 6 at the inside diameter d_i or at the outside diameter d_a of the friction surface 4 is thus always smaller than the total groove cross-section at a friction surface diameter anywhere between the inside d_i and outside d_a diameters. Thus, for the example embodiment illustrated in the FIGURE, it is unimportant whether the coolant is delivered to the inside diameter d_i or the outside diameter d_a of the friction surface 4.

In summary, the groove pattern of the friction lining plate 1 described effectively reduces the known "planing effect" and results in very favorable friction coefficient variation with very little rotary vibration tendency, in particular during the closing and slip operation of the frictional shift element, without having to reduce the net friction area available for torque transfer by an undesirably large percentage grooved fraction. Accordingly, according to the invention, the friction lining plate 1 is particularly well suited for a starting frictional shift element in a gearbox that can be operated in both rotation directions.

REFERENCE NUMERALS 1 friction lining plate
2 support sheet
3 support sheet carrier profile
4 friction surface of the friction lining
5 grooves of the first groove set
6 grooves of the second groove set
7 groove intersection point at the outside diameter of the friction lining or friction surface
8 groove intersection point at the inside diameter of the friction lining or friction surface
9 groove intersection point at the intermediate diameter of the friction lining or friction surface
d_a outside diameter of the friction surface
d_i inside diameter of the friction surface
d_m middle diameter of the friction surface
n_1 first rotation direction
t_w distribution angle

The invention claimed is:

1. A friction lining plate for a wet-running frictional shift element having at least one annular friction surface (4) That serves for frictional engagement and includes a first set of grooves (5) and a second set of grooves (6) both extending from an inner diameter (d_i) of the friction surface (4) Through which a coolant flows radially outward;
the first set of grooves (5) and the second set of grooves (6) are superimposed on the friction surface (4) such that the friction lining plate (1) is rotatable in either rotational direction; each groove (5) of the first set of grooves (5) extends in a rearward direction along the friction surface (4) from the inner diameter (d_i) to an outer diameter (d_a) of the friction lining plate at a first angle which is oblique relative to a radial;
each groove (6) of the second set of grooves (6) extends in a forward direction along the friction surface (4) from the inner diameter (d_i) to the outer diameter (d_a) of the frictional shift element at a second angle which is oblique relative to the radial;
each groove (6) of the second set of grooves (6) intersects three different grooves of the first groove set (5) and forms a maximum of three groove intersection points (7, 8, 9);
a first groove intersection point (8, 9) is located adjacent the inner diameter (d_i) of the friction lining plate;
a second groove intersection point (7, 9) is located adjacent the outer diameter (d_a) of the friction lining plate; and
a sum of circumferential lengths of all the grooves (5, 6) of the first and the second sets of grooves (5, 6), at the inner diameter (d_i), is less than a sum of circumferential lengths all the grooves (5, 6) of the first and the second sets of grooves (5, 6) at any individual radial distance between the inner diameter (d_i) and the outer diameter (d_a).

2. The friction plate according to claim 1, wherein, a sum of cross-sectional areas of all the grooves (5, 6) of the first and the second sets of grooves (5, 6) on the inner diameter (d_i) is less than a sum of cross-sectional areas of all the grooves (5, 6) of the first and the second sets of grooves (5, 6) at any individual radial distance between the inner diameter (d_i) and the outer diameter (d_a).

3. The friction lining plate according to claim 1, wherein at least one of the grooves (5) of the first set of grooves (5) and the grooves (6) of the second set of grooves (6) have one of a constant groove width over respective radial groove extensions or a constant groove cross-section over respective radial groove extensions.

4. The friction lining plate according to claim 3, wherein about 20% to 30% the friction surface of the friction lining plate is grooved.

5. The friction lining plate according to claim 1, wherein at least one of the grooves (5) of the first set of grooves (5) and the grooves (6) of the second set of grooves (6) have one of a non-constant width over respective radial groove extensions or a non-constant groove cross-section over respective radial groove extensions.

6. The friction lining plate according to claim 1, wherein the grooves (5, 6) of the first set and the second set of grooves (5, 6) have different groove widths and substantially equivalent groove cross-sections.

7. The friction lining plate according to claim 1, wherein the grooves (5) of the first set of grooves (5) have a different groove width and a different groove cross-section from the grooves (6) of the second set of grooves (6).

8. The friction lining plate according to claim 1, wherein about 20% to 30% the friction surface of the friction lining plate is grooved.

9. The friction lining plate according to claim 1, wherein the grooves (5, 6) of the first set and the second set of grooves (5,6) are symmetrically distributed on a periphery of the friction surface (4).

10. The friction lining plate according to claim 1, wherein the friction surface (4) is made of one of a paper containing fibrous material, a carbon fibrous material and a ceramic material.

11. The friction lining plate according to claim 1, wherein the friction lining plate (1) is coated on at least one of a first side and a second side.

12. A friction lining plate for a wet-running frictional shift element having at least one annular friction surface (4) that serves for frictional engagement and includes a first set of grooves (5) and a second set of grooves (6) both extending from an inner diameter (d_i) of the friction surface (4) through which a coolant flows radially outward;
the first set of grooves (5) and the second set of grooves (6) are superimposed on the friction surface (4) such that the friction lining plate (1) is rotatable in either rotational direction;
each groove (5) of the first set of grooves (5) extends in a rearward direction along the friction surface (4) from the inner diameter (d_i) to an outer diameter(d_a) of the friction lining plate at a first angle which is oblique relative to a radial;

each groove (6) of the second set of grooves (6) extends in a forward direction along the friction surface (4) from the inner diameter (d_i) to the outer diameter (d_a) of the frictional shift element at a second angle which is oblique relative to the radial;

each groove (6) of the second set of grooves (6) intersects three different grooves of the first groove set (5) and forms three groove intersection points (7, 8, 9);

a first groove intersection point (8) is located adjacent the inner diameter (d_i) of the friction lining plate; a second groove intersection point (7) is located adjacent the outer diameter (d_a) of the friction lining plate;

a third groove intersection point (9) is located between the outer and the inner diameters (d_i, d_a) of the friction lining plate; and a sum of circumferential lengths of all the grooves (5, 6) of the first and the second sets of grooves (5, 6), at the inner diameter (d_i), is less than a sum of circumferential lengths all the grooves (5, 6) of the first and the second sets of grooves (5, 6) at any individual radial distance between the inner diameter (d_i) and the outer diameter (d_a).

13. The friction plate according to claim 12, wherein, a sum of cross-sectional areas of all of the second groove intersection points (7) on the outer diameter (d_a) is less than the sum of the circumferential lengths of all the grooves (5, 6) of the first and the second sets of grooves (5, 6) at any individual radial distance between the inner diameter (d_i) and the outer diameter (d_a).

14. A friction lining plate for a wet-running frictional shift element having at least one annular friction surface (4) that includes grooves of a first set (5) and grooves of a second set (6) that extend from a radially inner circumference (d_i) of the annular friction surface (4) to a radially outer circumference (d_a) of the annular frictional surface (4) such that coolant flows between a radially interior and a radially exterior of the annular friction surface (4);

the grooves of the first set (5) and the grooves of the second set (6) are superimposed with respect to each about the annular friction surface (4) such that upon engagement with another surface, the friction lining plate (1) can rotate in either rotational direction;

each of the grooves of the first set (5) extends along the friction surface (4) from the radially inner circumference (d_i) to the radially outer circumference (d_a) rearwardly at a first angle oblique relative to a radial;

each of the grooves of the second set (6) extends along the friction surface (4) from the radially inner circumference (d_i) to the radially outer circumference (d_a) forward at a second angle oblique relative to the radial;

each of the grooves of the second set (6) intersects three of the grooves of the first set (5) at first, second and third groove intersection points (7, 8, 9);

the first groove intersection points (8) are each located about the radially inner circumference (d_i) of the friction lining plate;

the second groove intersection points (7) are each located at the radially outer circumference (d_a) of the friction lining plate; and the third groove intersection points (9) are each located radially midway between the radially inner circumference (d_i) and the radially outer circumference (d_a) of the friction lining plate.

\* \* \* \* \*